US006938126B2

(12) United States Patent
Ramirez et al.

(10) Patent No.: US 6,938,126 B2
(45) Date of Patent: Aug. 30, 2005

(54) CACHE-LINE REUSE-BUFFER

(75) Inventors: Alejandro Ramirez, St. Feliu de Llobregat (ES); Edward Grochowski, San Jose, CA (US); Hong Wang, San Jose, CA (US); John Shen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 328 days.

(21) Appl. No.: 10/121,524

(22) Filed: Apr. 12, 2002

(65) Prior Publication Data

US 2003/0196044 A1 Oct. 16, 2003

(51) Int. Cl.[7] .............................................. G06F 12/00
(52) U.S. Cl. ........................ 711/125; 711/118; 711/128; 711/137; 711/204; 712/205; 712/207; 712/237; 712/239
(58) Field of Search ................................ 711/118, 125, 711/128, 137, 204; 712/205, 207, 237, 239

(56) References Cited

U.S. PATENT DOCUMENTS

| | | | |
|---|---|---|---|
| 4,562,304 A | | 12/1985 | Ward et al. |
| 5,586,293 A | | 12/1996 | Baron et al. |
| 5,586,294 A | * | 12/1996 | Goodwin et al. ........... 711/137 |
| 5,606,676 A | | 2/1997 | Grochowski et al. |
| 5,623,615 A | * | 4/1997 | Salem et al. ................ 712/238 |
| 5,644,752 A | | 7/1997 | Cohen et al. |
| 5,706,465 A | * | 1/1998 | Kurokawa et al. .......... 711/123 |
| 5,903,911 A | | 5/1999 | Gaskins |
| 6,047,370 A | | 4/2000 | Grochowski |
| 6,076,153 A | | 6/2000 | Grochowski et al. |
| 6,205,542 B1 | | 3/2001 | Grochowski et al. |
| 6,304,962 B1 | * | 10/2001 | Nair ........................... 712/240 |
| 6,678,815 B1 | * | 1/2004 | Mathews et al. ........... 711/205 |
| 6,732,260 B1 | | 5/2004 | Wang et al. |
| 6,754,689 B2 | | 6/2004 | Bhushan et al. |
| 6,757,814 B2 | | 6/2004 | Kling et al. |
| 6,763,368 B2 | | 7/2004 | Bhushan et al. |

OTHER PUBLICATIONS

Alex Ramirez et al, "Fetching instruction streams", Technical Report UPC–DAC–2001–38. Nov. 2001, pp. 19 total.
Tech Encyclopedia, "Memory Caches"; "Disk Caches", Tech Web: The Business Technology Network, http://www.techweb.com, Copyright 1981–2000 The Computer Language Company, Inc., pp. 3 total.
Alex Ramirez et al., "Software Trace Cache", Database analysis, preliminary results on database code: Optimizing Instruction Cache Performance for Database Workloads. 1st Barcelona Industrial Affiliates Meeting, Barcelona (Spain). Jun. 1998. [Slides (ppt)], pp. 4 total.
Ramirez et al., "A Stream Processor Front–end", Department of Computer Architecture, Barcelona Spain, IEEE TCCA Newsletter, pp. 10–13. 2000. [Paper (ps), Slides (ppt)], pp. 4 total.
Ramirez et al., Trace cache redundancy: Red \& blue traces. Proceedings of the 6th Intl. Conference on High Performance Computer Architecture, Tolouse (France). Jan. 2000. [Paper (ps), Slides (ppt)],pp. 16 total.

* cited by examiner

*Primary Examiner*—Nasser Moazzami
*Assistant Examiner*—Ngoc V Dinh
(74) *Attorney, Agent, or Firm*—Blakely, Sokoloff, Taylor and Zafman

(57) ABSTRACT

A method, apparatus, and system that compares a current fetch request having a first start address and length associated with the current fetch request to a second start address of the next fetch request, determines whether the content already loaded in a buffer will be used to at least partially fulfill the next fetch request based upon the comparison, and inhibits access to an instruction cache based upon the comparison.

34 Claims, 9 Drawing Sheets

CACHE-LINE REUSE-BUFFER

FIELD OF THE INVENTION

This invention generally relates to cache memories. More particularly, an aspect of this invention relates to a cache-line reuse-buffer.

BACKGROUND OF THE INVENTION

A cache is generally a small fast memory holding recently accessed data, designed to speed up subsequent access to the same data. Instructions and data are transferred from main memory to the cache in blocks, using a look-ahead algorithm. The cache stores this information in one or more cache lines. Typically, sequential lines of instructions are stored in the cache lines. A fetch engine system speculatively stores consecutive sequential lines of instructions in anticipation of their future use.

FIG. 1 illustrates a prior art fetch engine system fetching a new cache line from the instruction cache every fetch cycle. The fetch engine system consists of a BTB engine, a branch predictor (BP), a return address stack (RAS), logic to determine the next address, and an instruction cache. The fetch engine fetches one full block of instructions from the instruction cache per cycle by accessing the instruction cache. The BTB engine and branch predictor (BP) provide instruction information of the current fetch cycle. The logic to determine the next address provides the next fetch address. The instruction cache consists of multiple cache lines. Note, the at sign "@" means "address."

In general, a cache line is a unit of information, such as multiple bytes, words, etc. In most Reduced Instruction Set Codes (RISC) systems, the cache lines are 32 bytes or 64 bytes wide. Typically, instructions are 4 bytes wide and fetch engines are designed to fetch 3–5 instructions (12–20 bytes) per clock cycle. Rather than reading a single word or byte from main memory at a time, each cache entry is usually holds a certain number of words, known as a "cache line" and a whole line is read and cached at once. However, it is very frequent that the same cache line is fetched in several consecutive cycles. This is especially true for long cache lines.

Typically, fetch performance is a very important factor because it effectively limits the overall processor performance. However, traditional thinking is usually that there is little performance advantage in increasing front-end performance beyond what the back-end can consume. For each processor design, typically the target is to build the best possible fetch engine for the required performance level. Thus, a fetch engine can fetch a certain number (width) of instructions per clock cycle. The fetch width of fetch operation preformed by the fetch engine is cooperated with the number of instructions that the processor can consume.

The prior art fetch engine reads a cache line from the instruction cache every cycle and then extracts the requested instructions from that cache line, as instructed by the fetch request. The fetch engine first tries to obtain these instructions from the instruction cache and then from main memory. The longer in width a cache line is the more area on the chip that a cache line occupies. If a fetch engine can only fetch X number of instructions, then traditional thinking has been why build a cache line that store 8× of instructions because the actual execution of those instructions by the processor will not occur any faster than if the cache line is 2×. Fetching a cache line wider than the actual fetch width of the processor represents a wasted number of instructions transferred, because not all the instructions in the cache line will be actually used/fetched for actual execution.

However, a fetch engine will be better if it provides better performance, but also if it takes fewer resources, requires less chip area, or consumes less power. Power consumption is becoming an important design factor in high performance microarchitectures. A design that consumes as little energy and dissipate as little power as possible is also advantageous.

Also, the increasing clock frequencies employed in current and future generation processors limits the size of cache memories, or else increases their access time. The use of line buffers has been implemented in main memory chips to reduce access time, providing a level of cache within the memory chip itself. However, some traditional thinking has been not to use line buffers for on-chip cache memories because it does not offer any speed performance advantage as long as the access time is one cycle.

BRIEF DESCRIPTION OF THE DRAWINGS

The drawings refer to the invention in which.

Figure 1:
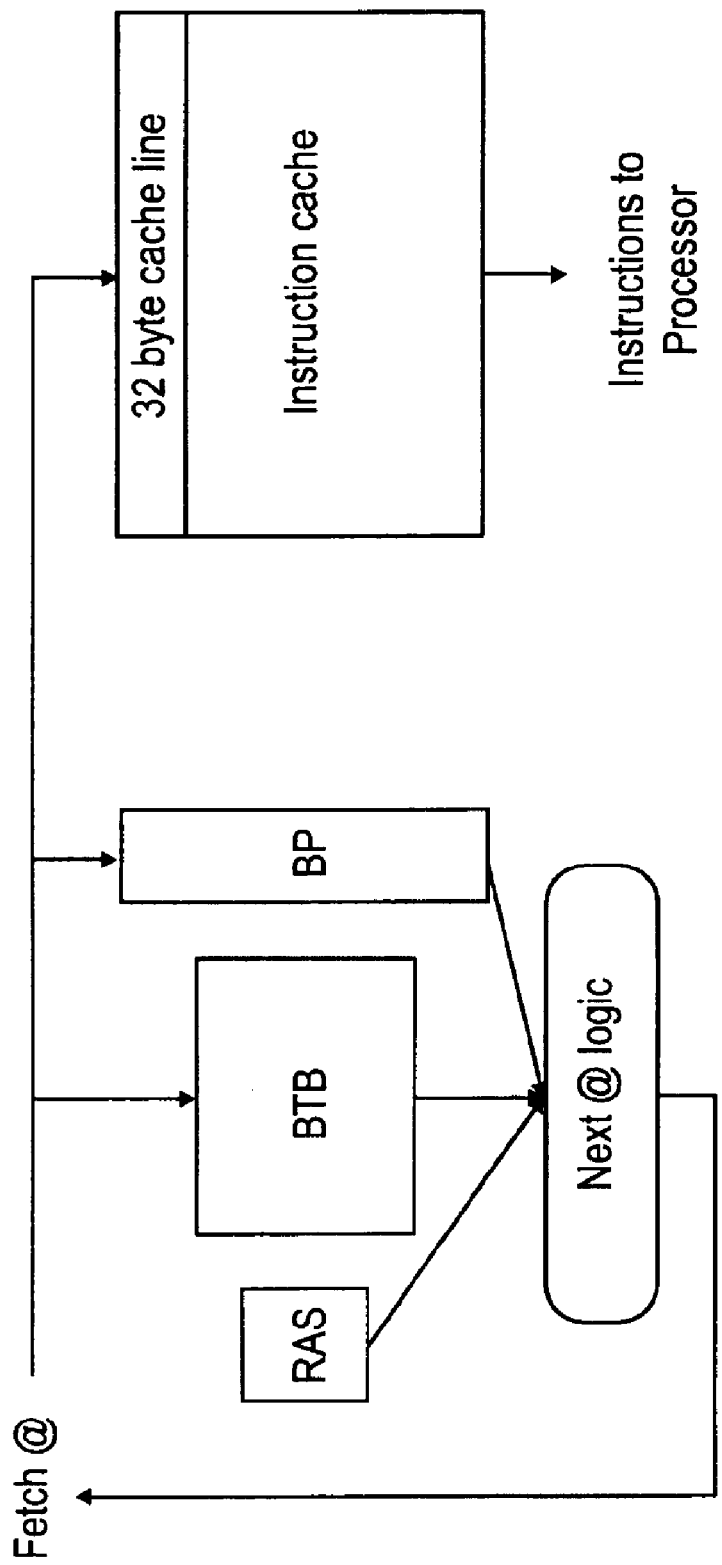
FIG. 1 illustrates a prior art fetch engine system fetching a new cache line from the instruction cache every fetch cycle.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of bytes in a cache line, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Further specific numeric references such as first starting address, may be made. However, the specific numeric reference should not be interpreted as a literal sequential order but rather interpreted that the first starting address is different than a second starting address. Thus, the specific details set forth are merely exemplary. The specific details may be varied from and still be contemplated to be within the spirit and scope of the present invention. The term coupled is defined as meaning connected either directly or indirectly.

In general, various methods, apparatuses, and systems are described that compare a current fetch request having a first start address and length associated with the current fetch request to a second start address of the next fetch request, determine whether the content already loaded in a buffer will be used to at least partially fulfill the next fetch request based upon the comparison, and inhibit access to an instruction cache based upon the comparison.

Figure 2:
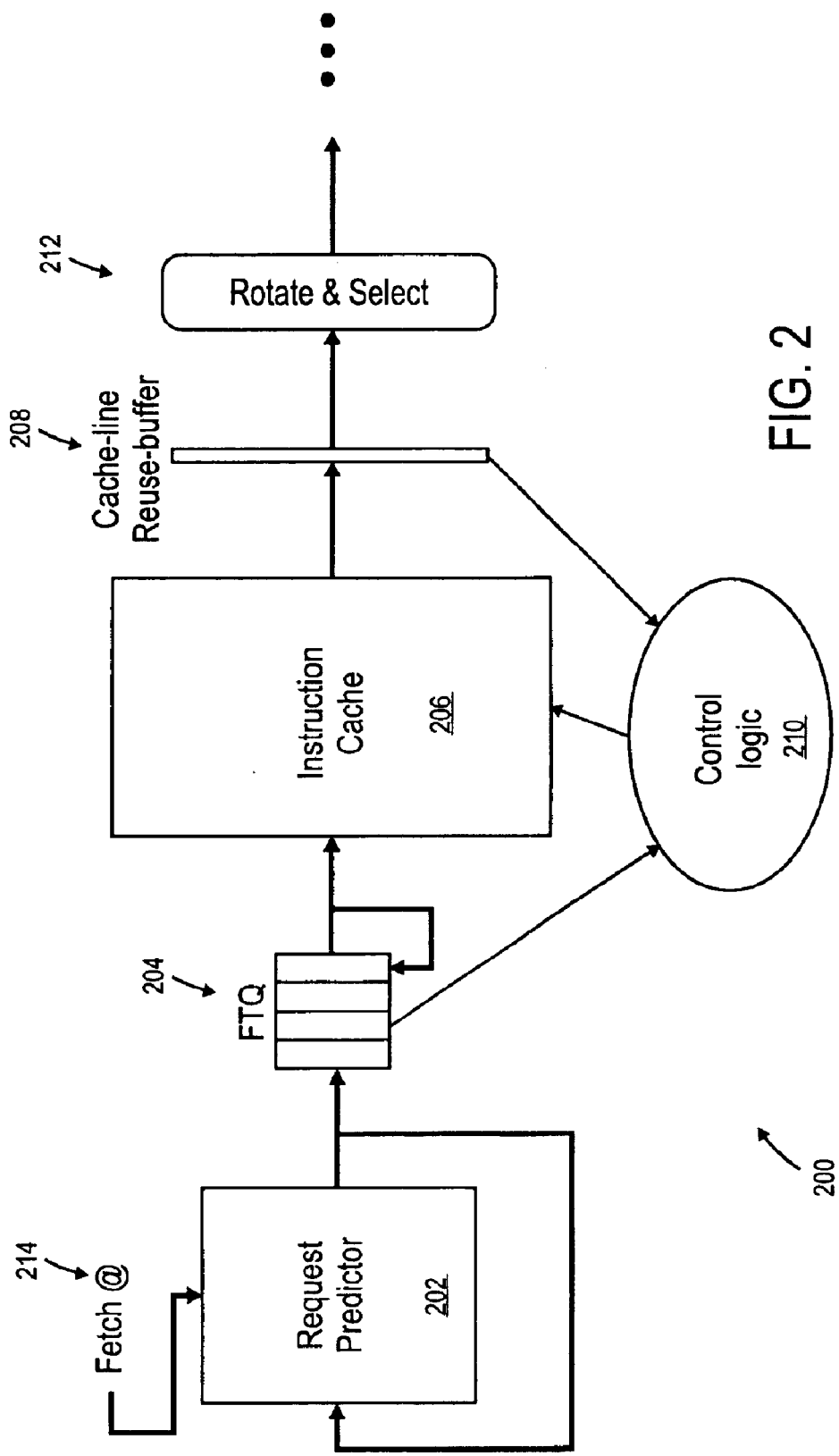
FIG. 2 illustrates a block diagram of an embodiment of the cache-line reuse-buffer to store a cache line from an instruction cache.

FIG. 2 illustrates a block diagram of an embodiment of the cache-line reuse-buffer to store a cache line from an instruction cache. Fetch engine system 200 may include components such as request predictor 202, a fetch target queue (FTQ) 204, an instruction cache 206, a cache-line reuse-buffer 208, control logic 210, rotate and select logic 212, and other similar components. In general, the fetch engine system 200 retrieves instructions from the instruction cache 206 and stores instructions in the instruction cache 206. The request predictor 202 receives the current fetch request 214. A fetch request 214 contains an indication of the starting address of the fetch request. The request predictor 202 speculates on the length associated to the current fetch request 214 and the fetch request for the next cycle. The request predictor 202 sends the starting address of the current fetch request, length of the current request, and the anticipated starting address of the fetch request for the next cycle to the fetch target queue 204. The fetch target queue 204 stores fetch requests (address and length) 214. The cache-line reuse-buffer 208 stores one or more cache lines of the instruction cache 206 corresponding to the current fetch request 214. In an embodiment, the length of the cache-line reuse-buffer 208, such as, for example, one hundred and twenty-eight bytes, matches the length of a single cache line, such as, for example, one hundred and twenty-eight bytes.

The control logic 210 determines if the content in the cache-line reuse-buffer 208 will be reused the next cycle or if a new cache line will be required. The control logic 210, such as a comparator, compares the starting address of the next request to the range of address stored in the cache-line reuse-buffer 208. If the starting address of the next fetch request falls within the range of address in the cache line already loaded in the cache-line reuse-buffer 208, then control logic 210 inhibits the signal to trigger accessing the instruction cache 206 to load another cache line into the cache-line reuse-buffer 208.

When a cache line from the instruction cache 206 is not loaded to provide the next set of instructions desired in the next fetch cycle, then power that would have been consumed to load that cache line is now saved. For example, consumed power may be saved from not energizing sense amplifiers associated with the instruction cache 206, reading word lines storing the desired instructions, energizing control circuitry associated with the instruction cache 206, and reloading the content of the cache line into the cache-line reuse-buffer 208. Some prior art systems access the instruction cache and load a cache line for each fetch request even if some or all of the content loaded in a cache line will be used to fulfill the next fetch cycle. The rotate and select logic 212 sends the instructions loaded in the cache-line reuse-buffer 208 to the pipeline for use by the processor.

In an embodiment, the fetch target queue (FTQ) 204 stores the starting address of the current fetch request 214, the length of the current fetch request 214 and the starting address of the next request. In an embodiment, the request predictor 202 may be a branch predictor, a stream predictor, a fetch request predictor or some other mechanism predicting the next needed instruction address. In an embodiment, the request predictor 202 may calculate the starting address of the next fetch request by adding the starting address of the current fetch request 214 and the length of the current request 214. In an embodiment, the request predictor 202 may determine the starting address of the next fetch request by identifying and decoding a branch instruction. In an embodiment, the control logic 206 may directly or indirectly inhibit accessing the instruction cache 206 to load another cache line for eventual processor use. In an embodiment, the request for instructions 214 may be a fetch request, an instruction stream request, or some other similar request for instructions that communicates the current start address of the request and length of the current request.

Figure 3:
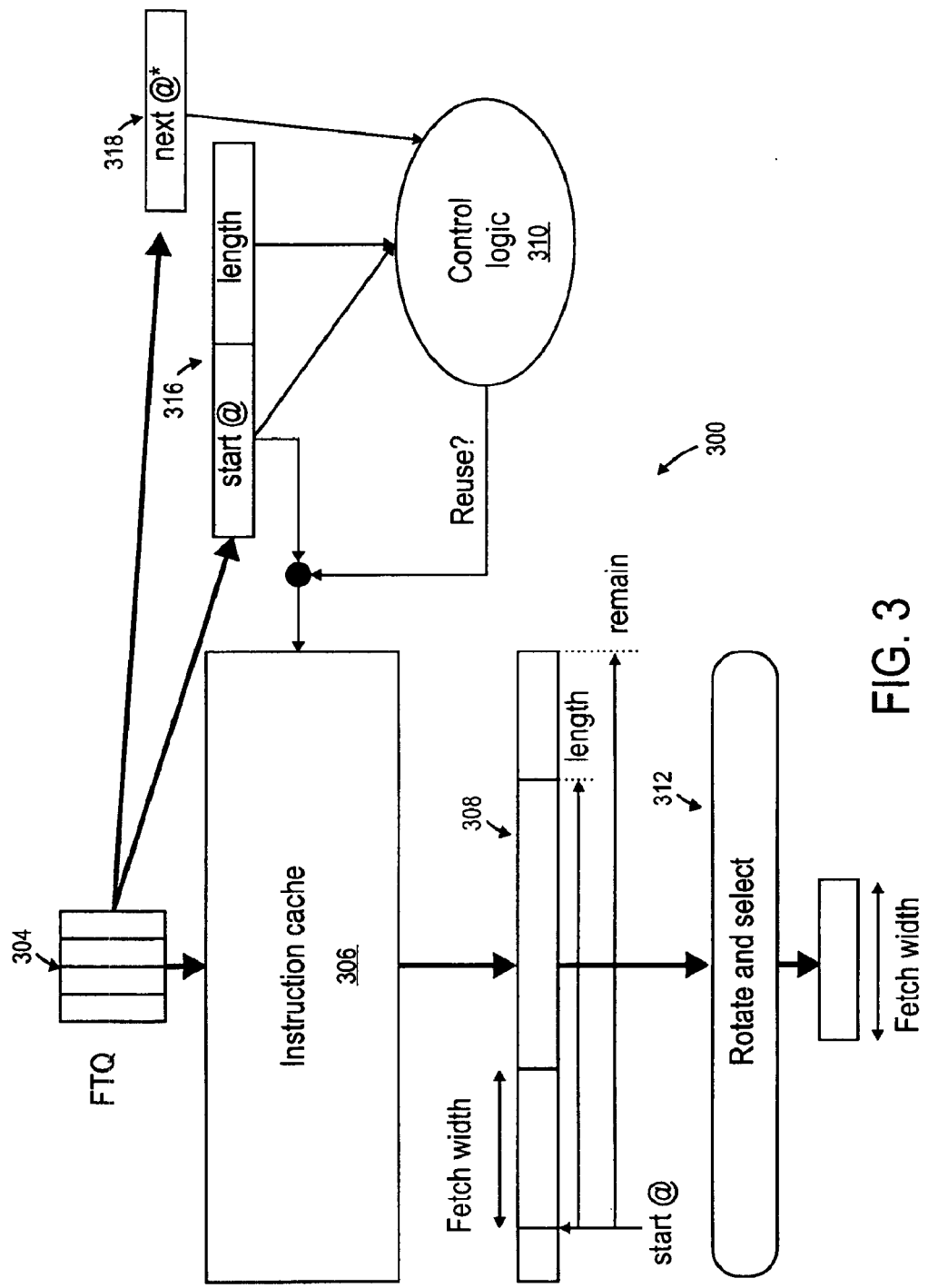
FIG. 3 illustrates a block diagram of an embodiment of the control logic cooperating with the cache-line reuse-buffer and a first address buffer and a second address buffer.

FIG. 3 illustrates a block diagram of an embodiment of the control logic cooperating with the cache-line reuse-buffer and a first address buffer and a second address buffer. The fetch engine system 300 has similar components as described above as well as a first address buffer 316 and a second address buffer 318. The first address buffer stores 316 the start address and request length for the current fetch cycle. The second address buffer 318 stores the starting address for the next fetch cycle. The control logic 310 decodes the current fetch request in the first address buffer 316 to determine the cache line required for the current fetch cycle, the starting address of the current fetch request, and the length of the current request. Similarly, the control logic 310 decodes the next fetch request to determine the start address of the next fetch cycle. In an embodiment, the control logic 310 may be programmed with fetch engine specifications such as fetch width of the fetch engine, cache line width, as well as other similar information. The control logic 310 compares the starting address of the next fetch request stored in the second address buffer 318 to the range of address loaded in the cache-line reuse-buffer 308 as identified by content in the first address buffer 316 in order to determine if all or some of the content in the cache-line reuse-buffer 308 will be used to fulfill the next fetch cycle.

Figure 4:
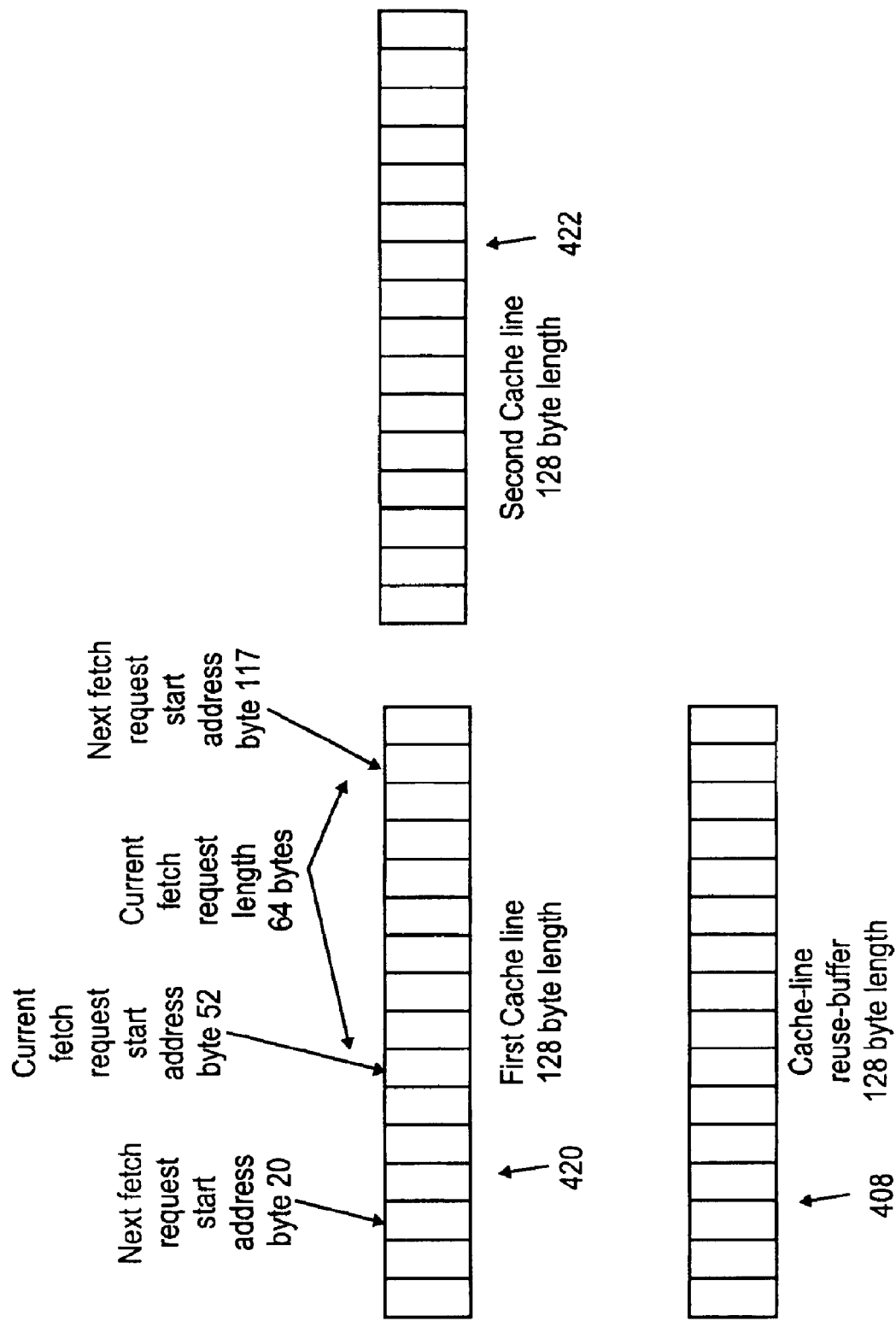
FIG. 4 illustrates an exemplary comparison of the current cache line stored in the cache-line reuse-buffer to the starting address of the next request to determine if all or some of the content in the cache-line reuse-buffer will be used to fulfill the next fetch cycle.

FIG. 4 illustrates an exemplary comparison of the current cache line stored in the cache-line reuse-buffer to the starting address of the next request to determine if all or some of the content in the cache-line reuse-buffer will be used to fulfill the next fetch cycle. The cache-line reuse-buffer 408 stores the content of the first cache line 420. The current fetch request correlates to the content of the first cache line 420. The control logic compares the starting address of the next request to the range of addresses stored in the cache-line reuse-buffer 408. In an Embodiment, the first cache line 420 is 128 bytes wide and so is the second cache line 422; the starting address of the current fetch starts on byte number 52; and the request length of the current fetch request is 64 bytes. Therefore, the 128 bytes in the stored cache-line reuse-buffer 408 will satisfy the current fetch request because the start address (byte 52) plus the length of the request (64 bytes) equals byte 116 which is equal to or less than the 128 byte width of the instructions stored in the first cache line 420. No necessity exists to load another cache line to satisfy the current fetch request. If the starting address of the next fetch request is either be the next sequential byte, byte 117, or branches to starting address in this same cache line, such byte 20, then the cache-line reuse-buffer 408 retains this same cache line, the first cache line 420, without loading in a new cache in from the instruction cache. Some exemplary cache-line reuse-buffer 408 scenarios will be further described later.

Note, the request length may be determined from various combinations of bytes per instruction and instructions fetched per clock cycle. For example, the 64 byte request length of the current fetch request may be four bytes per instruction and sixteen instructions fetched per clock cycle (64 bytes) or thirty-two bytes per instruction and two instructions fetched per clock cycle (64 bytes).

Referring to FIG. 3, the instruction cache 306 may be a direct mapped cache, fully associative cache, set associative cache, or other similar cache. The instruction cache 306 contains two or more cache lines to store instructions that the fetch engine system 300 speculates the processor will be using in the near future. In an embodiment, the fetch engine system 300 loads an instruction stream, composed of sequential instructions, into multiple consecutive cache lines anticipating the use of these instructions in a sequential order.

The instruction cache 306 is driven by the fetch requests stored in the fetch target queue 304. Not all instructions provided by the instruction cache 306 need to be fetched in a single cycle. If the single cache line contains the whole fetch request, then the control logic 310 communicates to the fetch target queue 304 to advance to the next request. If the single cache line does not contain the whole fetch request, the control logic 310 communicates to the fetch target queue 304 to update and reflect the remaining part of the stream to be fetched.

Figure 5:
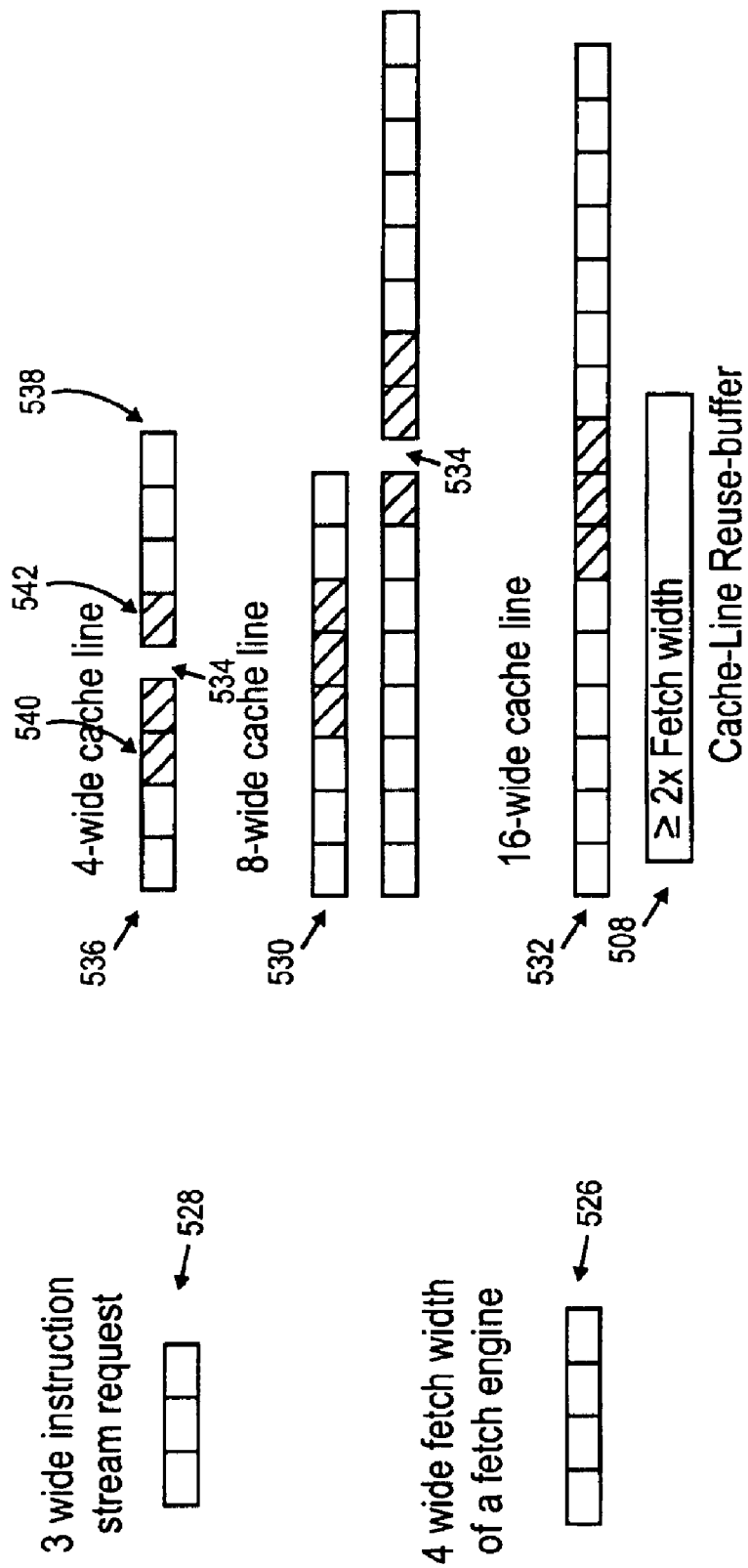
FIG. 5 illustrates a block diagram of an embodiment of a cache-line reuse-buffer having a length matched to a cache line that has a byte length equal to or greater than two times the fetch width of an instruction fetch operation performed by a fetch engine in order to reduce instruction misalignment.

FIG. 5 illustrates a block diagram of an embodiment of a cache-line reuse-buffer having a length matched to a cache hue that has a byte length equal to or greater than two times the fetch width of an instruction fetch operation performed by a fetch engine in order to reduce instruction misalignment. Instruction misalignment occurs when a single fetch request for consecutive instructions requires accessing two or more cache lines to fulfill that request. If instruction misalignment occurs the control logic communicates to the fetch target queue to update and reflect the remaining part of the stream to be fetched. A fetch engine having a four-wide fetch width 526 may fetch an exemplary fetch request consisting of three consecutive instructions 528. In an embodiment, the cache-line reuse-buffer 508 has a length matched to the exemplary eight-wide cache line 530. In an embodiment, the cache-line reuse-buffer 308 has a length matched to the exemplary sixteen-wide cache line 532.

In an embodiment, a fetch request consisting of three consecutive instructions 528 are be fetched in a single cycle by a fetch engine having a four-wide fetch width 526, but such is not always the case. A three-instruction stream request 528 may take more than one cycle to fetch on a fetch engine having a four-wide fetch width 526 if the instructions cross the cache line boundary 534. It is possible that the three instruction stream request 528 is split across two separate cache lines, a first four-wide cache-line 536 and a second four-wide cache-line 538. The starting address of the fetch request may be the third word line 540 of the first four-wide cache line 536 and continue in length to the first word line 542 of the second four-wide cache line 538. The fetch engine requires two clock cycles to fetch the entire fetch request. The second four-wide cache line 538 needs to be accessed and loaded to complete the single fetch request. Performance of the system may be impacted if it takes two clock cycles to complete a single fetch request.

The use of instruction cache lines having a greater byte width reduces the possibilities of the fetch request crossing the cache line boundary 534. In an embodiment, use of cache lines that posses width's twice that of the fetch width, eight-width 530 in this example, reduces the chances that the three-wide instruction stream fetch request 528 is split across a cache line boundary 534. In an embodiment, use cache lines that posses width's four times that of the fetch width, sixteen-width 532 in this example, significantly reduces the chances that the three-wide instruction stream fetch request 528 is split across a cache line boundary 534.

In an embodiment, the cache-line reuse-buffer 508 cooperates with layout optimized codes to benefit from denser packing of useful instructions to cache lines.

Referring to FIG. 3, the cache-line reuse-buffer 308 differs from the instruction cache 306 because the cache-line reuse-buffer 308 does not store its contents in a speculative manner expecting the loaded instructions to be used in future fetch cycles in order to be useful. The control logic 310 determines with certainty whether the some or all of the content in the cache-line reuse-buffer 308 will be reused or not in the next fetch cycle. The advanced certain knowledge of the necessities of the next fetch cycle allows the control logic 310 to determine whether to inhibit accessing the instruction cache 306 to save power, decide whether a cache line misalignment will occur in the current fetch cycle, as well as other similar decisions.

The cache-line reuse-buffer 308 may improve power dissipation by reducing instruction cache 306 accessing, potential latency performance and cache line misalignment. The cache-line reuse-buffer 308 reduces the activity of the instruction cache 306 by fully exploiting cache lines before fetching a new cache line. The cache-line reuse-buffer 308 has a defined length from which the control logic 310 can make advanced decisions with certainty about the instruction necessities of the current fetch cycle as well as the next fetch cycle with certainty. As noted in an embodiment, the defined length of the cache-line reuse-buffer 308 is matched to a single cache line. However, in another embodiment, the defined length of the cache-line reuse-buffer 308 may be matched to the combined width of two or more consecutive cache-lines. The defined length of the cache-line reuse-buffer 308 may be equal to or greater than four times the fetch width. The defined length of the cache-line reuse-buffer 308 may be equal to or greater than eighty bytes.

The actual instruction fetch proceeds from the contents of the cache-line reuse-buffer 308. The instructions are aligned using the starting address, and valid instructions are selected up to the maximum fetch width of the fetch engine or the remaining instructions in the cache-line reuse-buffer 308. Once all the valid instructions in the cache-line reuse-buffer 308 have been passed to the processor, new instructions are fetched from the instruction cache 306. The actual number of instructions fetched is then used to update the fetch target queue 304 entry, or to advance the fetch target queue 304 if the request was completely fetched.

Figure 6:
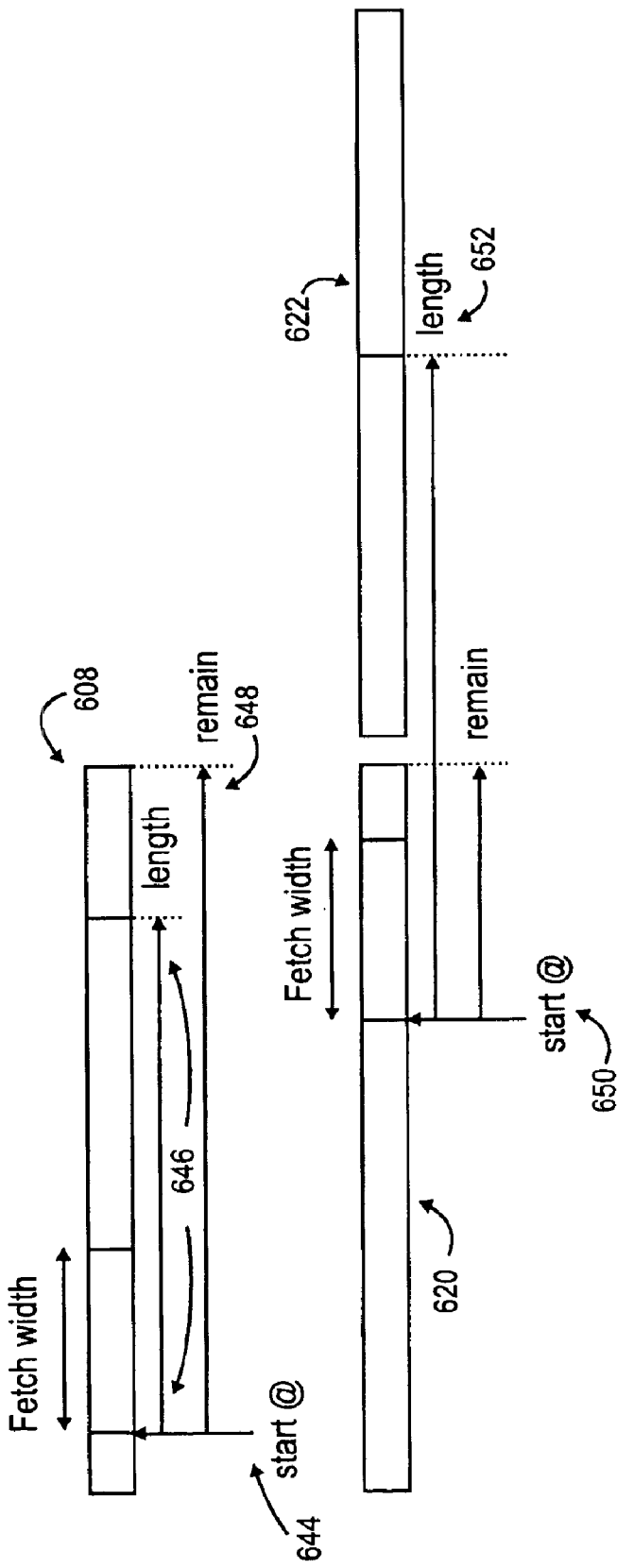
FIG. 6 illustrates a block diagram of an embodiment of a cache-line reuse-buffer loaded with content that partially fulfills a fetch request.

FIG. 6 illustrates a block diagram of an embodiment of a cache-line reuse-buffer loaded with content that partially fulfills a fetch request. If the start address of the fetch request plus the length of the fetch request is less than the content remaining in the cache-line reuse-buffer 608, then the that content completely fulfills the fetch request. However, the fetch request may also span across a first cache line 620 and a second cache line 622 and the defined length of the cache-line reuse-buffer 608 has loaded the content stored in the first cache line 620. The fetch request for the current cycle has a start address 650 that correlates to content within the first cache line 620. However, the length of the current request 652 is such that instructions desired by the current fetch request also are stored in the second cache line 622. The control logic determines the content already loaded in a cache-line reuse-buffer 608 will be used to at least partially fulfill the next fetch request and initially inhibits instruction cache access. The instruction fetch proceeds from the contents of the cache-line reuse-buffer 608. The instructions are aligned using the starting address of the current fetch request 650. The remaining valid instructions in the cache-line reuse-buffer 608 are selected to be sent to the processor. The actual number of instructions fetched is then used to update the fetch target queue entry. Once all the valid instructions in the cache-line reuse-buffer 608 have been passed to the processor, the control logic directs the cache-line reuse-buffer 608 to load new instructions from the second cache line. The instruction cache is accessed to load the content of the second cache line 622. The cache-line reuse-buffer 608 saved the power consumption approximately equal to one instruction cache access.

Figure 7:
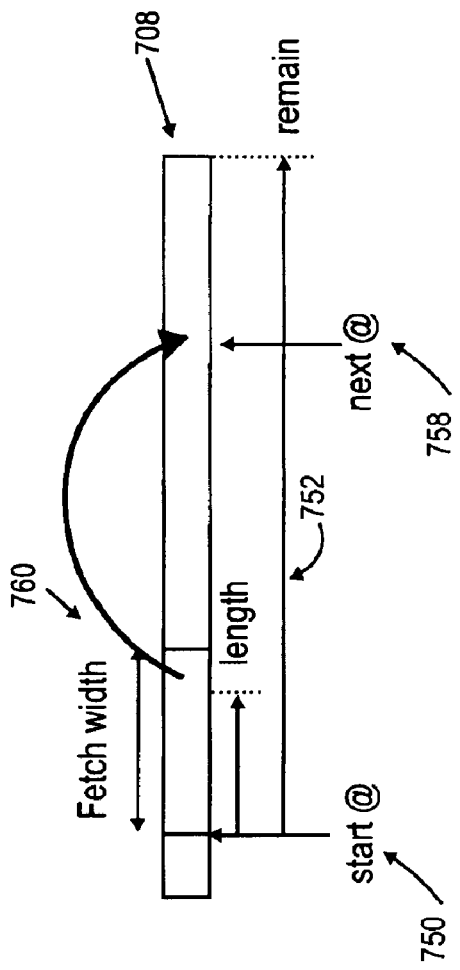
FIG. 7 illustrates a block diagram of an embodiment of cache-line reuse-buffer loaded with content that completely fulfills a fetch request.

FIG. 7 illustrates a block diagram of an embodiment of cache-line reuse-buffer loaded with content that completely fulfills a fetch request. The start address 750 and length 752 of the current fetch request falls within the range of address stored in the cache-line reuse-buffer 708. The request predictor identifies that the branch instruction of the next request also has a starting address 758 within the cache-line reuse-buffer 708. The fetch width 760 of the engine is approximately one third the length of the cache-line reuse-buffer 708. Three fetch cycles are required to complete the current fetch request. Thus, the cache-line reuse-buffer 708 reduces instruction cache activity when a cache line will be used several times to read a long instruction stream request. Also, the cache-line reuse-buffer 708 reduces instruction cache activity for a whole loop body, i.e. all the loop iterations occur within the content of the cache-line reuse-buffer 708. Being able to read instructions from the cache-line reuse-buffer 708 for several consecutive cycles means that there is no need to fetch a new cache line from the instruction cache. Therefore, it is not necessary to power up the instruction cache to read a new cache line.

Also, it is not necessary to wait for the cache line to be read if the instruction cache has a non-unit latency (that is, if reading from it takes several cycles). The increasing clock frequencies employed in current and future generation processors may limit the size of cache memories or else increase cache access time. In an environment with non-unit latency in the instruction cache, the cache-line reuse-buffer 708 could also be used to improve performance. If the instruction cache has a latency greater than one cycle, the cache-line reuse-buffer 708 provides a single cycle access time.

Figure 8:
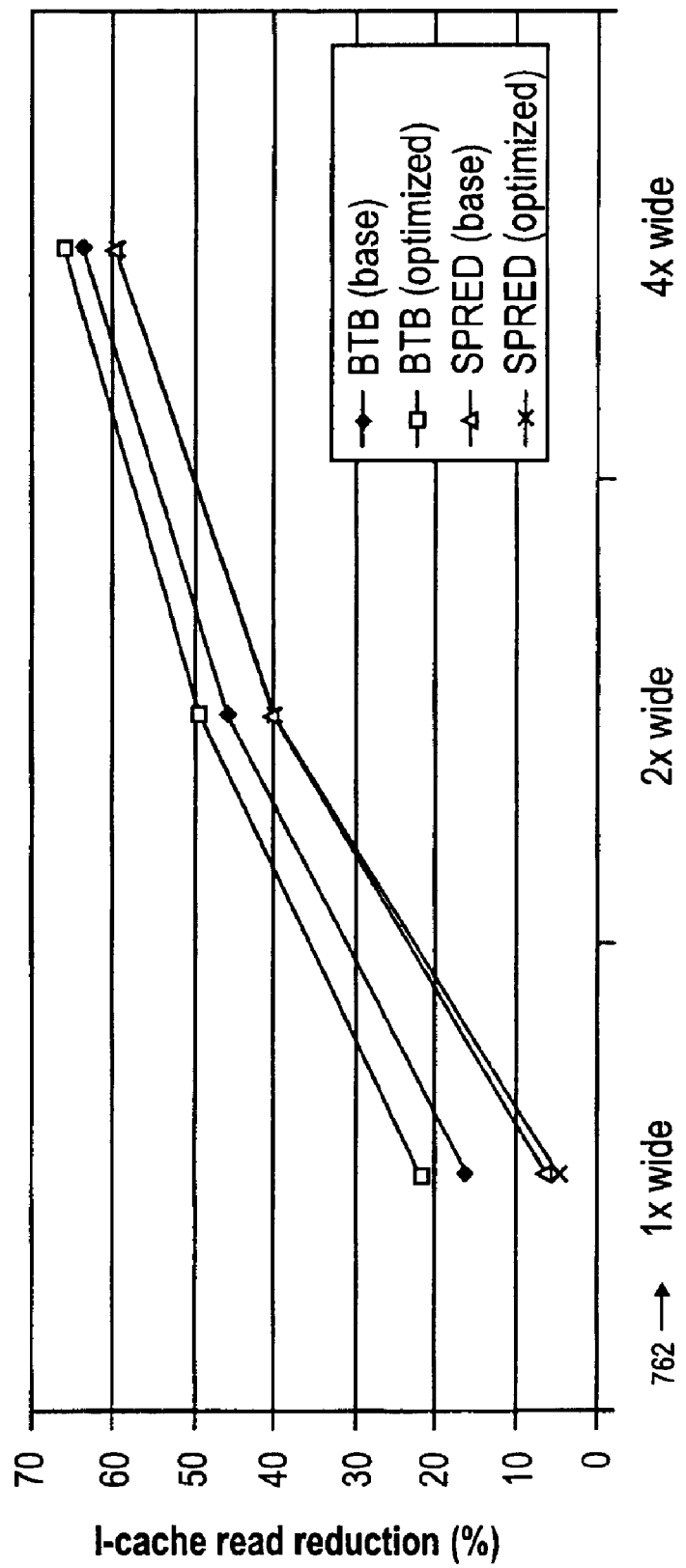
FIG. 8 illustrates an exemplary graph showing the fraction of instruction cache accesses that can be avoided using embodiments of the cache-line reuse-buffer having different lengths greater than the fetch width.

FIG. 8 illustrates an exemplary graph showing the fraction of instruction cache accesses that can be avoided using embodiments of the cache-line reuse-buffer having different lengths greater than the fetch width. The X axis 762 shows different cache-line reuse-buffer lengths, relative to the fetch width of the processor: a single cache line as wide as the fetch width, a single cache line twice as wide as the fetch width, and a cache line four times as wide as the fetch width.

If the increased cache line width scaled perfectly, a cache-line reuse-buffer twice as wide as the fetch width would reduce 50% of all accesses, and a cache line 4 times wider than the fetch width would save 75% of all accesses.

In an embodiment, due to instruction misalignment problems, the reduction obtained may not be perfect. For example, the reduction obtained may be 45% for 2× width and 65% for 4× widths.

In an embodiment, any of the logic described above consists of electronic circuits that follow the rules of Boolean Logic, software that contain patterns of instructions, or any combination of both. The software can be embodied onto a machine-readable medium A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. Slower mediums could be cached to a faster, more practical, medium.

Figure 9:
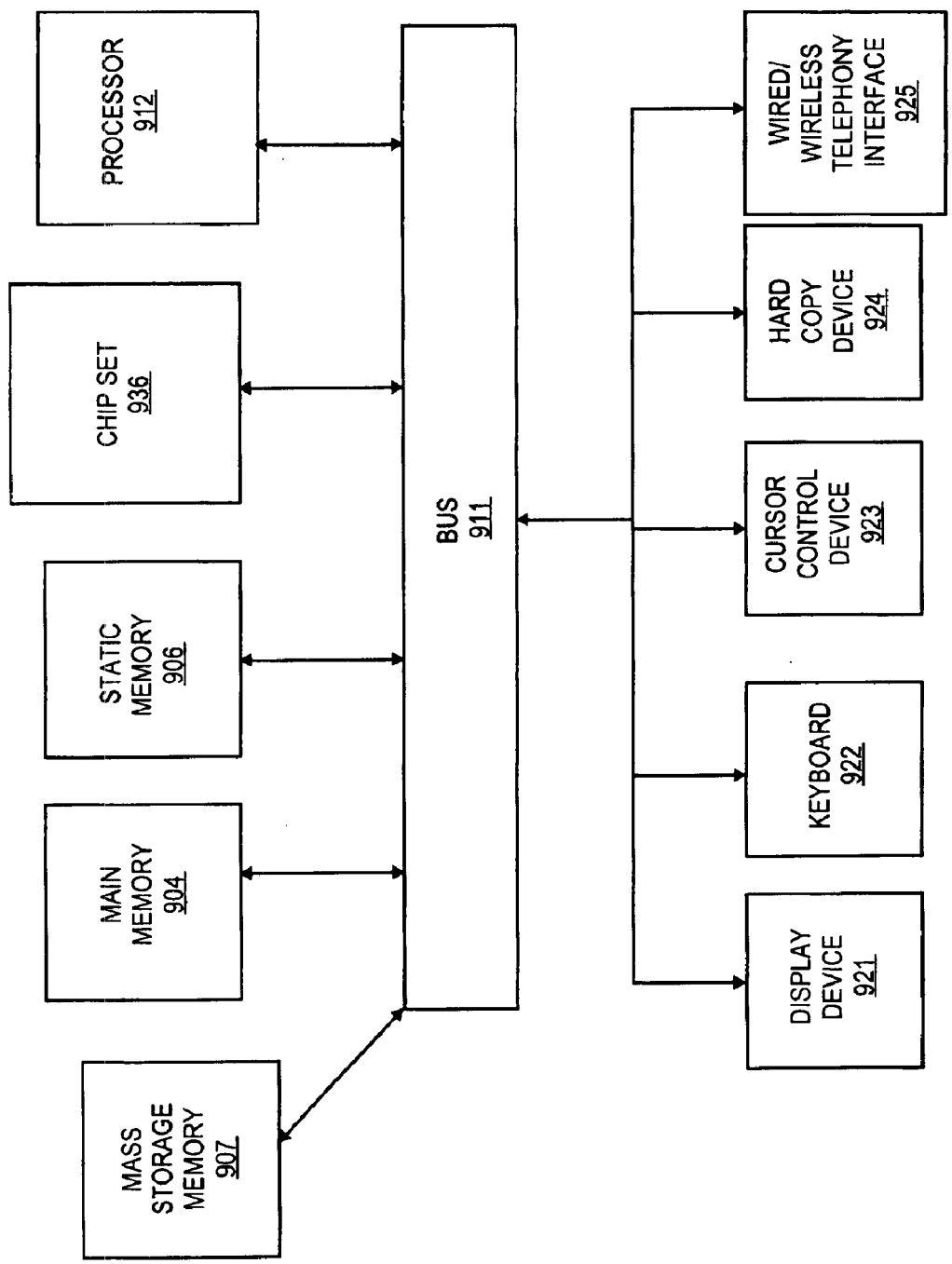
FIG. 9 illustrates a block diagram of an exemplary computer system that may use an embodiment of the cache-line reuse-buffer.

FIG. 9 illustrates a block diagram of an exemplary computer system that may use an embodiment of the cache-line reuse-buffer. In one embodiment, computer system 900 comprises a communication mechanism or bus 911 for communicating information, and an integrated circuit component such as a processor 912 coupled with bus 911 for processing information. One or more of the components or devices in the computer system 900 such as the processor 912 may contain a cache and use the cache line buffer.

Computer system 900 further comprises a random access memory (RAM), or other dynamic storage device 904 (referred to as main memory) coupled to bus 911 for storing information and instructions to be executed by processor 912. Main memory 904 also may be used for storing temporary variables or other intermediate information during execution of instructions by processor 912. In an embodiment, the Processor 912 may include a microprocessor, but is not limited to a microprocessor, such as a Pentium, PowerPC, etc.

Computer system 900 also comprises a read only memory (ROM) and/or other static storage device 906 coupled to bus 911 for storing static information and instructions for processor 912, and a mass storage memory 907, such as a magnetic disk or optical disk and its corresponding disk drive. Mass storage memory 907 is coupled to bus 911 for storing information and instructions.

Computer system 900 may further be coupled to a display device 921, such as a cathode ray tube (CRT) or liquid crystal display (LCD), coupled to bus 911 for displaying information to a computer user. An alphanumeric input device (keyboard) 922, including alphanumeric and other keys, may also be coupled to bus 911 for communicating information and command selections to processor 912. An additional user input device is cursor control device 923, such as a mouse, trackball, trackpad, stylus, or cursor direction keys, coupled to bus 911 for communicating direction information and command selections to processor 912, and for controlling cursor movement on a display device 912.

Another device that may be coupled to bus 911 is a hard copy device 924, which may be used for printing instructions, data, or other information on a medium such as paper, film, or similar types of media. Furthermore, a sound recording and playback device, such as a speaker and/or microphone (not shown) may optionally be coupled to bus 911 for audio interfacing with computer system 900. Another device that may be coupled to bus 911 is a wired/wireless communication capability 925 to communication to a phone.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. In an embodiment, if some or all of the content in same cache line will be used in two consecutive cycles, the control logic may send a signal to the cache-line reuse-buffer or some other component to ensure that the instruction cache is not accessed. The invention is to be understood as not limited by the specific embodiments described herein, but only by scope of the appended claims.

What is claimed is:

1. An apparatus, comprising:
   an instruction cache having two or more cache lines;
   a first buffer having a defined length to store content of a single cache line; and
   control logic to compare a first starting address and a first length associated with a current fetch request to a second starting address associated with a next fetch request to eliminate an access to the instruction cache, wherein content from the current fetch request stored in the first buffer is used to fulfill the next fetch request based upon the comparison.

2. The apparatus of claim 1, wherein the control logic can make a decision in advance of the current fetch cycle with certainty about the instruction necessities of the current fetch cycle as well as the next fetch cycle based upon the defined length of the first buffer.

3. The apparatus of claim 2, wherein making the decision in advance of the current fetch cycle comprises comparing the requested address prior to data access.

4. The apparatus of claim 1, wherein the control logic can make a decision concurrent with the current fetch cycle with certainty about the instruction necessities of the current fetch cycle as well as the next fetch cycle based upon the defined length of the first buffer.

5. The apparatus of claim 1, further comprising:
   a first address buffer to store a representation of the first starting address associated with the current fetch request and the first length associated with the current fetch request; and
   a second address buffer to store a representation of the first starting address associated with the next fetch request.

6. The apparatus of claim 1, wherein the defined length is equal to or greater than 80 bytes.

7. An apparatus, comprising:
   an instruction cache having two or more cache lines;
   a first buffer having a defined length to store content of a single cache line, wherein the defined length is equal to or greater than four times the fetch width of an instruction fetch operation performed by a fetch engine; and
   control logic to compare a first starting address and a first length associated with a current fetch request to a second starting address associated with a next fetch request to eliminate an access to the instruction cache to fulfill the next fetch request based upon the comparison.

8. The apparatus of claim 1, wherein the control logic comprises electronic circuits that follow the rules of Boolean Logic.

9. The apparatus of claim 6, wherein the first buffer comprises a cache-line reuse-buffer.

10. The apparatus of claim 6, wherein the defined length is equal to or greater than 128 bytes in order to reduce accessing the instruction cache.

11. The apparatus of claim 7, wherein the defined length is equal to or greater than four times the fetch width of a fetch engine in order to reduce instruction misalignment across at least two of the cache lines.

12. The apparatus of claim 1, further comprising:
    a fetch target queue to store a representation of the first starting address associated with the current fetch request, the first length associated with the current fetch request, and the second starting address associated with the next fetch request.

13. A method, comprising:
    comparing a current fetch request having a first start address and length associated with the current fetch request to a second start address of a next fetch request;
    determining whether the content already loaded in a buffer will be used to at least partially fulfill the next fetch request based upon the comparison; and
    inhibiting access to an instruction cache based upon the comparison and in response to the comparison, using the content already loaded in the buffer to at least partially fulfill the next fetch.

14. The method of claim 13, further comprising:
    providing a single cycle access time to the instruction cache, the instruction cache having a latency greater than one cycle.

15. The method of claim 13, further comprising:
storing content of two or more cache lines in a first buffer that has a byte length equal to or greater than 80 bytes.

16. A method, comprising:
comparing a current fetch request having a first start address and length associated with the current fetch request to a second start address of a next fetch request;
determining whether the content already loaded in a buffer will be used to at least partially fulfill the next fetch request based upon the comparison; inhibiting access to an instruction cache based upon the comparison; and
storing content of two or more cache lines in a first buffer that has a byte length equal to or greater than four times the fetch width of an instruction fetch operation performed by a fetch engine.

17. The method of claim 13, further comprising:
storing content of a single cache line in first buffer that has a byte length equal to or greater than 80 bytes, the single cache line having a first length that matches a second length of the first buffer.

18. The method of claim 16, further comprising:
storing content of a single cache line in first buffer that has a byte length equal to or greater than four times the fetch width of a fetch engine, the single cache line having a first length that matches a second length of the first buffer.

19. A machine readable storage having instructions, which when executed by the machine, cause the machine to perform a method comprising:
comparing a current fetch request having a first start address and length associated with the current fetch request to a second start address of a next fetch request;
determining whether the content already loaded in a buffer will be used to at least partially fulfill the next fetch request based upon the comparison; and
inhibiting access to an instruction cache based upon the comparison and in response the comparison, using the content already loaded in the buffer to at least partially fulfill the next fetch.

20. The machine readable storage medium of claim 19, wherein the instructions, when executed, further cause the machine to perform a method comprising:
making decisions in advance of the current fetch cycle with certainty about the instruction necessities of the current fetch cycle as well as the next fetch cycle with certainty.

21. A machine readable storage medium having instructions, which when executed by the machine, cause the machine to perform a method comprising:
comparing a current fetch request having a first start address and length associated with the current fetch request to a second start address of a next fetch request;
determining whether the content already loaded in a buffer will be used to at least partially fulfill the next fetch request based upon the comparison;
inhibiting access to an instruction cache based upon the comparison; and
initiating a signal to store content of a single cache line in first buffer that has a byte length equal to or greater than four times the fetch width of a fetch engine, the single cache line having a first length that matches a second length of the first buffer.

22. An apparatus, comprising:
means for comparing a current fetch request having a first start address and length associated with the current fetch request to a second start address of the next fetch request;
means for determining whether the content already loaded in a buffer will be used to at least partially fulfill the next fetch request based upon the comparison; and
means for inhibiting access to an instruction cache based upon the comparison and in response to the comparison, using the content already loaded in the buffer to at least partially fulfill the next fetch.

23. The apparatus of claim 22, further comprising:
means for making decisions in advance of the current fetch cycle with certainty about the instruction necessities of the current fetch cycle as well as the next fetch cycle with certainty.

24. An apparatus, comprising:
means for comparing a current fetch request having a first start address and length associated with the current fetch request to a second start address of the next fetch request;
means for determining whether the content already loaded in a buffer will be used to at least partially fulfill the next fetch request based upon the comparison;
means for inhibiting access to an instruction cache based upon the comparison; and
means for initiating a signal to store content of a single cache line in first buffer that has a byte length equal to or greater than four times the fetch width of a fetch engine, the single cache line having a first length that matches a second length of the first buffer.

25. A computing system, comprising:
a processor to execute instructions;
an instruction cache to store instructions in two or more cache lines;
a first buffer having a defined length to store content of a single cache line; and
control logic to compare a first starting address and a first length associated with a current fetch request to a second starting address associated with a next fetch request to eliminate an access to the instruction cache, wherein content from the current fetch request stored in the first buffer is used to fulfill the next fetch request based upon the comparison.

26. The computing system of claim 25, the control logic can make a decision in advance of the current fetch cycle with certainty about the instruction necessities of the current fetch cycle as well as the next fetch cycle based upon the defined length of the first buffer.

27. The computing system of claim 25, wherein the defined length is equal to or greater than 80 bytes.

28. A computing system, comprising:
a processor to execute instructions;
an instruction cache to store instructions in two or more cache lines;
a first buffer having a defined length to store content of a single cache line, wherein the first buffer has a bit length equal to or greater than four times the fetch width of an instruction fetch operation performed by a fetch engine; and
control logic to compare a first starting address and a first length associated with a current fetch request to a second starting address associated with a next fetch request to eliminate an access to the instruction cache to fulfill the next fetch request based upon the comparison.

29. The system of claim 25, further comprising a video interface for a display device, wherein the processor cooperates with the video interface.

30. The system of claim 28, further comprising a video interface for a display device, wherein the processor cooperates with the video interface.

31. The apparatus of claim 1, wherein content for the next fetch request is located in a different cache line then the content for the current fetch request and the control logic eliminates access to the different cache line in the instruction cache because the first buffer already stores both the content used in the current fetch and content from the different cache line.

32. The apparatus of claim 1, wherein the control logic couples to the instruction cache and a fetch request target queue.

33. The system of claim 25, wherein content for the next fetch request is located in a different cache line then the content for the current fetch request and the control logic eliminates access to the different cache line in the instruction cache because the first buffer already stores both the content used in the current fetch and content from the different cache line.

34. The system of claim 25, wherein the control logic couples to the instruction cache and a fetch request target queue.

* * * * *